United States Patent Office 2,790,836
Patented Apr. 30, 1957

2,790,836

CONTINUOUS PRODUCTION OF PENTAERYTHRITOL

Robert L. Mitchell and Ralph M. Pritchett, Corpus Christi, Tex., assignors to Celanese Corporation of America, New York, N. Y., a corporation of Delaware No Drawing. Application May 21, 1953,
Serial No. 356,598

10 Claims. (Cl. 260—635)

This invention relates to the production of pentaerythritol and relates more particularly to a continuous process for the manufacture of pentaerythritol from formaldehyde and acetaldehyde.

Pentaerythritol, a tetrahydric alcohol having the formula $(CH_2OH)_4C$, has been employed extensively for the production of many useful materials, such as synthetic drying oils, alkyd resins and explosives. In the usual processes for the production of pentaerythritol, acetaldehyde has been reacted with formaldehyde in the presence of an alkaline material such as calcium hydroxide, according to the equation:

$8CH_2=O + 2CH_3-CH=O + Ca(OH)_2 \longrightarrow$

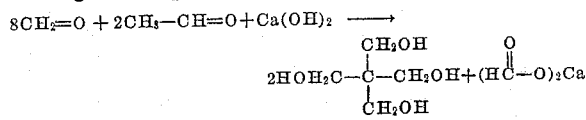

However, the prior processes for the production of pentaerythritol have not lent themselves to efficient and economical continuous production and have necessitated unduly costly and relatively inefficient batchwise operation.

It is an object of this invention to provide a novel and economical process for the continuous and efficient production of pentaerythritol which will be free from the aforementioned and other disadvantages.

A further object of this invention is the provision of a continuous process for the production of pentaerythritol of high purity by the reaction of acetaldehyde and formaldehyde.

According to the present invention, a continuous stream of a mixture of formaldehyde in excess, acetaldehyde, water, and an alkaline condensing agent for the reaction is passed through a reaction zone maintained at an elevated temperature, preferably not above 150° F., to produce an effluent stream comprising an aqueous alkaline mixture of pentaerythritol and unreacted formaldehyde. The effluent stream is neutralized continuously by the addition of an acidic material, following which the unreacted formaldehyde is removed, as by distillation. The mixture remaining after the removal of the unreacted formaldehyde may then be concentrated by evaporation and subsequently cooled in order to crystallize out the pentaerythritol.

In a preferred procedure for carrying out the process of this invention, formaldehyde, acetaldehyde and water are blended continuously to produce a stream of aqueous mixed aldehydes. An alkali, such as sodium hydroxide, is then injected into this stream under such conditions that mixing is rapid and complete. When the alkali is added the mixture begins to react exothermically and its temperature increases. The reacting mixture is then passed continuously through a reaction vessel, or reactor, of such capacity that the mixture may remain therein for a sufficient time for the completion of the reactions resulting in the formation of pentaerythritol. After completion of these reactions the mixture leaves the reactor and is neutralized continuously by the addition of an acid, following which the unreacted formaldehyde is removed by distillation. It is preferred to carry out this distillation continuously and to distill off so much formaldehyde that the residue from the distillation contains no more than 1% by weight of formaldehyde. The formaldehyde-containing distillate is recycled by mixing at least a portion of said distillate with the original stream of mixed aldehydes, while the residue from the distillation is led to an evaporator where it is concentrated by the removal of a substantial proportion of its water content at an elevated temperature. After the evaporation step the concentrated mixture is cooled, whereupon there is obtained a slurry of crystals of pentaerythritol dispersed in an aqueous mother liquor saturated with pentaerythritol. In order to recover these crystals in a substantially pure condition the mother liquor is removed mechanically, as by centrifuging, and the crystals are then washed with cold water. When a still purer product is desired the washed crystals are redissolved in hot water and recrystallized by cooling the resulting solution.

More particularly, in the first step of the process acetaldehyde, formaldehyde and water are blended thoroughly in any convenient device for mixing liquids, such as, for example, an agitated vessel, a mixing pump, a pipe in which there is turbulent flow, or an orifice mixer. The blending operation should be carried out at a temperature low enough, or a pressure high enough, to prevent any appreciable loss of acetaldehyde by evaporation. Although the proportions in the mixture of acetaldehyde, formaldehyde and water may be varied widely, it is desirable to have present in said mixture an excess of formaldehyde over the amount theoretically necessary for reaction with all of the acetaldehyde. Thus, while the thoretical amount is 4 moles of formaldehyde per mole of acetaldehyde, proportions of 8 to 15 moles of formaldehyde per mole of acetaldehyde result in much better yields and improved quality of the product. The formaldehyde is generally supplied in the form of an aqueous solution thereof. As is well known in the art, many aqueous solutions of formaldehyde contain methanol, which is frequently added to stabilize said solutions or which may be present because of the effect of a Cannizzaro reaction in said solutions. However, we have found that the presence of methanol is undesirable since it causes the yield of pentaerythritol in the process to be lowered significantly. Accordingly, for best results the formaldehyde should contain so little methanol that the methanol content of the mixture of formaldehyde, acetaldehyde and water will be below about 2%, preferably below about 1%, based on the total weight of the mixture. As previously stated, a portion of the formaldehyde used to make this mixture may be recycled formaldehyde in the form of the aqueous distillate obtained by the distillation of excess formaldehyde from the reaction mixture after the pentaerythritol has formed.

In the second step of the preferred embodiment of the process of this invention, an alkali, such as sodium hydroxide, calcium hydroxide or potassium hydroxide, is injected into the flowing aqueous mixture of the other reactants, that is, the mixture of acetaldehyde, formaldehyde and water, under such conditions that mixing is rapid and complete. If the alkali is not mixed completely and rapidly into the other reactants there is tendency for undesirable side reactions to occur, one such side reaction resulting in the formation of resinous materials which tend to foul the equipment. Accordingly, the alkali and other reactants should be mixed homogeneously within a period of less than about 2 minutes, preferably less than about 15 seconds, after they are placed into contact with each other. The mixing operation may be carried out by passing the alkali and the other reactants through a centrifugal pump; by injecting a high velocity jet of the alkali into a pipe through which the other reactants are flowing; by injecting the alkali into the other reactants in any device in which there is turbulent flow, such as an orifice mixer; or in any other manner which yields the desired complete mixture rapidly. For best results, i. e. optimum yield and quality of product, the mixture of aldehydes should be at a relatively low temperature, e. g. 85° F., preferably 80° F. or below, just before it is mixed with the alkali. It is desirable to add the alkali in the form of an aqueous solution thereof, e. g. a 20% solution of sodium hydroxide, and to employ 1.1 chemical equivalents of the alkali per mole of the acetaldehyde. Use of more than about 1.1 equivalent of alkali per mole of acetaldehyde is wasteful of the alkali; tends to catalyze undesirable side reactions, causing a reduction of the efficiency of the process and producing impurities which are difficult to remove from the final product; and results in an undesirable increase in the concentration of inorganic salts in the final product. At least one equivalent of alkali per mole of acetaldehyde is necessary in order that reaction may be complete, one mole of alkali being the stoichiometric equivalent of one mole of acetaldehyde in the reaction.

After the alkali has been added, the mixture, which now is beginning to react exothermically, passes through a reaction vessel, or reactor, which may be of any suitable construction, e. g. a cylindrical vessel provided with internal baffles to minimize recirculation, or back-mixing, of the mixture passing through it. The capacity of the reactor and the rate of flow of the mixture therethrough are such that the material remains in the reactor for a period of time sufficient to allow the completion of the reactions resulting in pentaerythritol formation. This period of time depends on the temperature at which the reactants are maintained in the reactor. Thus, at a reaction temperature of about 130 to 140° F., which yields optimum results, the reaction is complete in about 45 minutes but it is permissible to allow the mixture to remain at this temperature in the reactor for a somewhat longer period of time, e. g. 1½ to 2 hours. Extension of reaction time far beyond that necessary for complete reaction, however, results in progressive contamination from side reactions, and degradation of formaldehyde from reaction with excess alkali which is present. Higher or lower temperatures in the reactor necessitate correspondingly shorter or longer periods of reaction. Thus, we have obtained good results where the reactor residence time was 4 hours at 115° F. and also where it was 30 minutes at 160° F. However, temperatures above 150° F. are undesirable since these temperatures tend to cause side reactions and to increase the formation of undesirable polypentaerythritols.

The desired reaction temperature may be attained by heating the reactor, by cooling it, or by operating it adiabatically. More particularly, the exothermic reaction, which begins on the addition of the alkali, releases most of its heat very rapidly (within about 5 minutes) after the alkali is added, so that upon entering the reactor the reactants may be already at or near the highest temperature that they can attain without an additional supply of heat. For example, when using a preferred mixture of 3% by weight of acetaldehyde, 20% by weight of formaldehyde, calculated as anhydrous formaldehyde, and 77% by weight of water, the addition of the alkali causes the evolution of sufficient heat to raise the temperature of the mixture by 50° to 55° F. under substantially adiabatic conditions, so that if such a mixture is at a temperature of 80° F. before the addition of the alkali it will enter the reactor at or near the desired temperature of 130° to 135° F. Of course, if the mixture is at lower initial temperature or is more dilute the adiabatic heat of reaction will not be sufficient to raise its temperature to 130° F. or above and it may be necessary, if it is desired to operate within this range of temperatures, to heat the mixture before it enters the reactor or to heat the reactor, as by means of steam coils, injection of live steam, or other suitable means. Similarly, if the mixture is at a higher temperature, e. g. above about 100° F., or is less dilute, cooling may be necessary in order to prevent the temperature of the reaction mixture from exceeding 150° F. Such cooling may be accomplished, for example, by passing the reactants over or through a cooler, before or after the alkali is injected, but preferably before, or by placing cooling coils or other cooling devices in or on the reactor itself.

In order to obtain optimum results it is desirable that there be as little back-mixing, or recirculation, of the reactants as possible during the early stages of the reaction, i. e. during the first five or ten minutes thereof. To this end the reaction may be carried out advantageously in a vertical cylindrical vessel having suitable baffles to minimize back-mixing. The reacting mixture is fed into this vessel at the bottom thereof, flows upwardly past the baffles and is removed at the top. Preferably the reacting mixture enters the vessel before said mixture attains its maximum reaction temperature, so that the temperature of the mixture rises as the mixture passes upward through the lower part of the vessel and there is very little back-mixing due to thermal convection in the vessel during the early stages of the reaction. Back-mixing in the early stages may also be avoided by making the piping leading to the reaction vessel of such length that the reactants take about five minutes to pass through said piping before entering the vessel. With regard to the upward flow in the vessel, such flow provides another advantage in that any vapors of acetaldehyde which may tend to escape from the reacting mixture entering the vessel are forced to pass through the whole body of reacting mixture in said vessel.

When the mixture leaves the reactor it is alkaline, generally having a pH of 9.5 to 10.5, and should be neutralized so as to avoid undesirable side reactions in the subsequent processing steps. Thus, if the pH is allowed to remain above about 7.0 during the subsequent steps of the process, alkali-catalyzed reactions will occur, causing contamination of the product and consuming a part of the excess formaldehyde which is present. If the mixture is neutralized to a pH of 7.0 or below, but above 6.0 to 6.5, there is a tendency for small amounts of impurities to be formed during the subsequent distillation step. These impurities appear in the aqueous formaldehyde recovered as the distillate in this distillation step and, when said distillate is recycled to produce more pentaerythritol, the presence of such impurities may have an adverse effect on the pentaerythritol-forming reaction. We have found that it is desirable, therefore, to neutralize the mixture until its pH is in the range of about 5.0 to 6.5. The color of the final product is lighter when this neutralization is carried to a pH of about 5 to 5.5 than when it is in the range of about 5.5. The neutralization step may be carried out by injecting an acidic material, such as acetic acid, formic acid, sulfuric acid or hydrochloric acid, into the stream of the mixture leaving the reactor, using for this purpose any suitable device for mixing liquids, such as a vessel equipped with an agitator, a centrifugal pump, or a section of pipe in which there is turbulent flow. A preferred acidic material for use in the neutralization step is a 50% aqueous solution of acetic acid.

After the reaction liquor has been neutralized, it is distilled to separate the unreacted formaldehyde in the form of an aqueous solution thereof, leaving behind an aqueous solution of pentaerythritol and other non-volatile reaction products. The formaldehyde content of this residue from the distillation is desirably not greater than 1%, e. g. 0.2–1.0%, by weight. If the formaldehyde content is much higher than this, side reactions tend to occur in later stages of the process, forming impurities which hinder proper crystallization and separation of pentaerythritol. Also, any formaldehyde present in the residue from the distillation is not available for recycling and therefore represents a loss of formaldehyde from the process.

It is preferred to carry out the distillation step under superatmospheric pressure, e. g. a pressure of about 15 to 22 pounds per square inch gauge, corresponding to a maximum distillation temperature of about 265° F. The use of superatmospheric pressure makes it easier to recover the unreacted formaldehyde as distillate in a practical concentration, e. g. 15 to 22% by weight, suitable for recycling. Lower superatmospheric pressures and atmospheric pressures can be employed, if desired, but lower pressures tend to produce less concentrated distillates and are, therefore, less desirable from the standpoint of practical operation. However, because of the necessarily lower distillation temperatures, the quality of the residue from the distillation may be improved when such lower pressures are employed. Pressures higher than 22 pounds per square inch gauge will give improved separation of formaldehyde from the distillation residue, but pressure (and temperature) should for the sake of product quality be kept as low as practicable. Advantageously, the distillation may be carried out continuously in a fractionating column with the neutralized reaction mixture being fed into the column at an intermediate point, the aqueous formaldehyde distillate being removed from the top of the column and the pentaerythritol-containing residue being recovered from the bottom of the column.

In the preferred procedure a stream of the formaldehyde-containing distillate is recycled, as previously described. In order to guard against the building up of volatile impurities which may affect the pentaerythritol-forming reaction adversely, a portion of the distillate, e. g. 25%, is separated from the main stream being recycled and is subjected to a further purification step before said portion is employed in the production of more pentaerythritol. Since the amount of distillate required to be drawn off is a function of reaction conditions and feedstock purity, it sometimes may be much less than 25%. The purification of this portion may be carried out in any desired manner, e. g. by re-distillation or solvent extraction. As previously stated, one of the impurities which affects the pentaerythritol-forming reaction is methanol, so that it is desirable to keep the methanol content of the recycled stream of aqueous formaldehyde as low as practicable, best results being obtained when this methanol content is below 1%.

After the distillation step, the pentaerythritol-containing residue, or liquor, is concentrated, as by evaporating off a portion of its water and traces of acids at an elevated temperature, and the resulting heated concentrated liquor is then cooled to crystallize out the pentaerythritol. The aforementioned concentrated liquor contains appreciable amounts of alkali formate which is produced in the pentaerythritol-forming reaction. Since it is not desired to precipitate out this alkali formate during the cooling and crystallizing operation, it is preferable to halt the evaporation step at or before the point where the concentration of alkali formate in the liquor becomes equal to the saturation value of said alkali formate at the temperature of the cooling and crystallizing operation. However, the evaporation step can be carried further if the crystallized pentaerythritol is to be subjected to recrystallization, since in the latter case any alkali formate which forms during the first crystallization operation can be removed during recrystallization. In determining when to halt the evaporation step, the amount of the alkali formate present in the liquor need not be measured directly but may be calculated from the rate of consumption of alkali during the process. Under the steady-state conditions obtaining in our continuous process the boiling point of the liquor provides a good indication of the concentration of the alkali formate in said liquor. Thus, when the alkali is sodium hydroxide and is supplied in the amount of about 1.0 to 1.1 equivalents per mole of acetaldehyde, it is desirable to concentrate the liquor until the boiling point of said liquor is 190 to 200° F. at an absolute pressure of 13.2 inches of mercury when no recrystallization step is used, and until its boiling point is about 220° F. at an absolute pressure of 15.2 inches of mercury when a recrystallization step is employed. The duration of evaporation process may also be controlled on the basis of the specific gravity of the liquor. Thus, the evaporation may be continued until the specific gravity of the liquor reaches a value of about 1.32, measured at 190° F. The evaporation step may be carried out in either a forced circulation evaporator or a natural circulation evaporator, and the distillate from the evaporator may be discarded. It is desirable to carry out the evaporation under vacuum in order to avoid unduly high temperatures of operation.

The liquor coming from the evaporator is cooled, preferably to a temperature of 40 to 55° F., to produce a relatively viscous slurry of pentaerythritol crystals in a mother liquor, and the mother liquor is then separated from the crystals in any desired manner, such as by means of a centrifugal filter. The cooling step may be carried out, continuously or otherwise, in any suitable type of apparatus, such as an adiabatic crystallizer or mechanical crystallizer of the Swenson-Walker type. It is often desirable, for ease of handling, to reduce the viscosity of the slurry in the crystallizer by adding thereto a portion of the separated mother liquor obtained from the centrifugal filter.

One important characteristic of the pentaerythritol crystals obtained according to the present invention is their relatively large size. This characteristic large crystal size makes it relatively easy to remove the mother liquor from the crystals in the centrifugal filter. On the other hand, in processes in which any unreacted formaldehyde present after the reaction step is destroyed or converted to other compounds, e. g. condensation products, by various secondary reactions, the crystals obtained are relatively fine and more difficult to separate from the mother liquor.

After the mother liquor has been substantially removed, the pentaerythritol crystals are washed with a spray of water while said crystals are being rotated in the centrifugal filter, in order to extract any alkali formate and organic impurities remaining on said crystals. The amount of wash water used and the temperature of said water depend on the degree of purity desired and also upon whether the product is to be recrystallized. Thus, if a subsequent recrystallization step is to be employed, it is preferable to use a relatively small proportion of water e. g. ½ to 1 part or less by weight of wash water per part by weight of crystals, but if there is to be no recrystallization step a larger quantity of water, e. g. one to two parts by weight of wash water per part by weight of crystals, yields the best results. When the wash water is at a low temperature, e. g. a temperature of about 40° F., re-solution of the pentaerythritol in the wash water is minimized and the large crystal size of the pentaerythritol is best preserved. However, the use of wash water at a higher temperature, e. g. a temperature of about 70° F., is slightly more effective in cleaning crystals of borderline quality. The mother liquor separated in the centrifugal filter may be discarded or it may, if desired, be subjected to further processing to recover the pentaerythritol contained therein. After the wash water is separated from the crystals, it is preferably combined with the liquor entering the evaporator, so that the pentaerythritol contained in said wash water may be recovered.

The crystals produced at this stage of the process are of a satisfactory "technical grade" quality, containing only about 3% to 7% of pentaerythritol ethers, and are superior to the technical grade crystals usually produced by other processes in that the latter crystals usually are of smaller size and poorer color, and contain 10% to 15% of pentaerythritol ethers. The crystals produced at this stage of the process of the invention may, therefore, be dried and used without further purification. A superior product, however, having a higher hydroxy value, a higher melting point and a better color, can be produced by recrystallizing these crystals. In the recrystallization operation, the wet crystals obtained after the washing step are dissolved in water near the boiling point, using, for example, about 120 to 150 parts by weight of water per 100 parts by weight of wet crystals, and the resulting hot solution is filtered to remove any suspended contaminants which may be present. It is preferred to filter through paper in a pressure-leaf type of filter, but any similar filter of the polishing type may be employed. For best results one should not use a vacuum filter in which, because of the vacuum, there is a chilling effect causing precipitation of pentaerythritol crystals in the filter medium and filtrate lines. After the filtering step, the pentaerythritol crystals are formed by cooling the solution, the mother liquor is separated, and the crystals are washed, all in the manner described above in connection with the first crystallization step. Only about ½ part by weight of cold water per part by weight of crystals need be employed in the washing operation, and both the separated mother liquor and the washings should be returned to the evaporation step for reconcentration. The resulting wet crystals are dried in any type of drier suitable for the drying of organic crystals, preferably at a relatively low temperature, e. g. about 200° F., and are then screened, e. g. on a 20-mesh screen, and packaged. Any oversize clumps of crystals retained on the screen are reground and rescreened. The crystals are of high grade, being substantially free of impurities.

The continuous process of this invention has many advantages over the batch processes of the prior art. It makes possible the production of high quality pentaerythritol in excellent yields with very little waste of formaldehyde. Because of the continuous nature of the process, automatic control instruments may be used more freely, less operating labor is involved even without automatic controls, and the capital investment necessary for the production of the pentaerythritol at a given rate is much lower.

The following example is given to illustrate this invention further.

*Example I*

Into a pipe leading to the suction side of a centrifugal pump there are continuously injected, at a constant rate, 5360 parts by weight per hour of uninhibited aqueous formaldehyde solution, said 5360 parts by weight containing 1471 parts by weight of formaldehyde and about 0.2% methanol, the remainder being water and the trace impurities present in commercial aqueous uninhibited formaldehyde, 2800 parts by weight per hour of water, 7710 parts by weight per hour of recycled formaldehyde solution (described below), said 7710 parts by weight containing 1464 parts by weight of formaldehyde, the remainder being water and traces of impurities, and 403 parts by weight per hour of acetaldehyde containing 3% of impurities such as propylene oxide. The resulting stream has a temperature of about 85° F. At the same time there are continuously injected into the centrifugal pump, at a constant rate, 1880 parts by weight per hour of an aqueous sodium hydroxide solution containing 385 parts by weight of NaOH and the remainder water. The resulting mixture leaving the pump is passed to the bottom of a vertical cylindrical insulated reactor provided with a plurality of semi-circular baffles of diameter equal to the diameter of the reactor spaced along its height. A rapid evolution of heat occurs in the mixture leaving the pump, so that the temperature at the base of the reactor is 140° F., while the temperature at the top of the reactor is 130° F. due to loss of heat to the surroundings.

The mixture, which takes 60 minutes to pass through the reactor, has a pH of 9.9 on leaving the top of said reactor. This alkaline mixture is continuously neutralized to a pH of 5.9 to 6.1 by mixing it continuously with 64 parts by weight per hour of a solution of 33 parts by weight of acetic acid in 31 parts by weight of water, and the neutralized liquid is fed to the 18th tray from the bottom of a 24 tray fractionating tower operating at a pressure (on the distillate receiver) of 15 pounds per square inch gauge and at a reflux ratio of 1 part by weight of reflux to 1 part by weight of distillate removed. In each hour there are recovered 10,280 parts by weight of an aqueous distillate containing 1952 parts by weight of formaldehyde. Of this distillate 7710 parts by weight per hour are directly recirculated for admixture with fresh formaldehyde and acetaldehyde, as described above. The stripped liquor from the base of the tower is combined with washings and recrystallization liquor from later steps, to be described below, and is fed to a forced circulation evaporator operating at an absolute pressure of 13.2 inches of mercury, where it is concentrated until its boiling point reaches 200° F. at the pressure prevailing in the evaporator. For each hour of operation of the evaporator there are produced 7960 parts by weight of distillate, containing 132 parts by weight of formaldehyde, the remainder being water and traces of acids. The concentrated liquor produced by the evaporation step is fed to a mechanical crystallizer where it is cooled to a temperature of 50 to 55° F. during a period of 4 to 8 hours, following which the mother liquor is separated from the resulting precipitated crystals of pentaerythritol in a centrifugal filter. The separated mother liquor is discarded and the crystals are washed in the centrifugal filter with water at 40° F., the amount of wash water being about equal in weight to the weight of the crystals, after which the washed crystals are redissolved in water at 210° F. in amount equal to about 1.2 times the weight of the crystals, and the resulting solution is filtered through a pressure leaf filter and then cooled in a mechanical crystallizer to a temperature of 40 to 45° F. during a period of 4 to 6 hours. The resulting crystals are separated and washed in a centrifugal filter and the mother liquor and wash water obtained from these separation and washing steps is recycled to the evaporator together with the wash water obtained from the first crystallization operation. The substantially pure washed crystals are dried. For each hour of operation 814 parts by weight of substantially pure pentaerythritol are obtained, representing 67.3% of the amount theoretically obtainable from the acetaldehyde consumed in the reaction and 72.9% of the amount theoretically obtainable from the formaldehyde consumed in the reaction. If the amount of pentaerythritol present in the discarded mother liquor from the first crystallization step is included, the corresponding yields of pentaerythritol are 84.0% and 91.2% based on acetaldehyde and formaldehyde, respectively.

Analyses of the dried crystals, both before and after the recrystallization step, are listed below:

| | Before Recrystallization | After Recrystallization |
|---|---|---|
| Ash, wt. Percent | 0.04 | 0.01 |
| Water, wt, Percent | 0.09 | 0.30 |
| Melting Point | 237 | 253 |
| OH Content, wt, Percent | 48.4 | 48.6 |
| Cold $H_2SO_4$ Color, Gardner Scale | 3 | below 3 |
| Hot $H_2SO_4$ Color, Gardner Scale | 6 | 3 |
| Phthalic Anhydride Color, degrees A. P. H. A. | 200 | 100 |
| Alkyd Resin Color, Gardner Scale | 6¼ | 4½ |

*Example II*

Into a pipe leading to the suction side of a centrifugal pump there are continuously injected, at a constant rate, 3720 parts by weight per hour of uninhibited aqueous formaldehyde solution, said 3720 parts by weight containing 1071 parts by weight of formaldehyde and about 0.2% methanol, the remainder being water and the trace impurities present in commercial aqueous uninhibited formaldehyde, 1920 parts by weight per hour of water, 4320 parts by weight per hour of recycled formaldehyde solution (described below), said 4320 parts by weight containing 873 parts by weight of formaldehyde, the remainder being water and traces of impurities, and 257 parts by weight per hour of acetaldehyde containing 3% of impurities such as propylene oxide. The resulting stream has a temperature of about 80° F. At the same time there are continuously injected into the centrifugal pump, at a constant rate, 1330 parts by weight per hour of an aqueous sodium hydroxide solution containing 273 parts by weight of NaOH and the remainder water. The resulting mixture leaving the pump is passed to the bottom of a vertical cylindrical insulated reactor provided with a plurality of semi-circular baffles of diameter equal to the diameter of the reactor spaced along its height. A rapid evolution of heat occurs in the mixture leaving the pump, so that the temperature at the base of the reactor is 135° F. while the temperature at the top of the reactor is 125° F. because of heat loss to the surroundings.

The mixture, which takes 60 minutes to pass through the reactor, has a pH of 10.3 on leaving the top of said reactor. This alkaline mixture is continuously neutralized to a pH of 5.9 to 6.1 by mixing it continuously with 58 parts by weight per hour of a solution of 30 parts by weight of acetic acid in 28 parts by weight of water, and the neutralized liquid is fed to the 18th tray from the bottom of a 24 tray fractionating tower operating at a pressure (on the distillate receiver) of 20 pounds per square inch gauge and at a reflux ratio of 1 part by weight of reflux to 1 part by weight distillate removed. In each hour there are recovered 5760 parts by weight of an aqueous distillate containing 1164 parts by weight of formaldehyde. Of this distillate 4320 parts by weight per hour are directly recirculated for admixture with fresh formaldehyde and acetaldehyde, as described above. The stripped liquor from the base of the tower is combined with washings and recrystallization liquor from later steps to be described below, and is fed to a forced circulation evaporator operating at an absolute pressure of 14.3 to 15.3 inches of mercury, where it is concentrated until its boiling point reaches approximately 220° F. at the pressure prevailing in the evaporator. The degree of concentration in this case, however, is controlled principally by specific gravity, concentration being carried to the point at which the specific gravity of the concentrated liquor is 1.32 measured at 190° F. For each hour of operation of the evaporator there are produced 5565 parts by weight of distillate, containing 40 parts by weight of formaldehyde, the remainder being water and traces of acids. The concentrated liquor produced by the evaporation step is fed to a mechanical crystallizer where it is cooled to 50 to 55° F. during a period of 6 to 8 hours, following which the mother liquor is separated from the resulting precipitated crystals of pentaerythritol in a centrifugal filter. The separated mother liquor is discarded and the crystals are washed in the centrifugal filter with water at 40° F., the amount of wash water being equal in weight to ½ the weight of the crystals, after which the washed crystals are redissolved in water at 210° F., in amount equal to 1½ times the weight of the crystals, and the resulting solution is filtered through a pressure leaf filter and then cooled in a mechanical crystallizer to a temperature of 40 to 45° F. during a period of 4 to 6 hours. The resulting crystals are separated and washed in a centrifugal filter and the mother liquor and wash water obtained from these separation and washing steps is recycled to the evaporator together with the wash water obtained from the first crystallization operation. The substantially pure washed crystals are dried. For each hour of operation 666 parts by weight of substantially pure pentaerythritol are obtained, representing 85.7% of the amount theoretically obtainable from the acetaldehyde consumed in the reaction and 75.3% of the amount theoretically obtainable from the formaldehyde consumed in the reaction. If the amount of pentaerythritol present in the discarded mother liquor from the first crystallization step is included, the corresponding yields of pentaerythritol are 95.3% and 83.8%, based on acetaldehyde and formaldehyde, respectively.

Analyses of the dried crystals, both before and after the recrystallization step, are listed below. In this example the evaporation was carried to maximum concentration for the sake of high ultimate product recovery, with the result that before recrystallization the crystals are high in color and ash content.

|  | Before Recrystallization | After Recrystallization |
| --- | --- | --- |
| Ash, wt, Percent | 0.96 | 0.03 |
| Water, wt, Percent | 0.04 | 0.55 |
| Melting Point, °C | 183 | 247 |
| OH Content, wt, Percent | 46.9 | 48.5 |
| Cold $H_2SO_4$ Color, Gardner Scale | 8 | 4 |
| Hot $H_2SO_4$ Color, Gardner Scale | 12 | 7 |
| Phthalic Anhydride Color, degrees A. P. H. A. | 500 | 125 |

It is to be understood that the foregoing detailed description is given merely by way of illustration and that many variations may be made therein without departing from the spirit of our invention.

Having described our invention what we desire to secure by Letters Patent is:

1. Process for the continuous production of pentaerythritol which comprises continuously mixing together acetaldehyde, 8 to 15 moles of formaldehyde per mole of acetaldehyde, water and sodium hydroxide rapidly and with agitation to cause said aldehydes and sodium hydroxide to react at a temperature of 115 to 160° F., then continuously neutralizing the reaction mixture by adding an acidic material thereto, continuously distilling unreacted formaldehyde from said neutralized mixture, and recovering pentaerythritol from the residue of said distillation.

2. Process as set forth in claim 1 in which said reactants are mixed so as to produce a homogeneous mixture within a period of mixing of less than 15 seconds.

3. Process as set forth in claim 2 in which said homogeneous mixture reacts for at least about the next five minutes without substantial back-mixing.

4. Process as set forth in claim 1 in which said distillation is carried out under a superatmospheric pressure of about 15 to 22 pounds per square inch gauge and the major portion of the resulting distilled unreacted formaldehyde is recycled into admixture with said reactants while the reaction mixture is maintained free of more than about 2% of methanol, based on the total weight of the reaction mixture.

5. Process as set forth in claim 1 in which the reaction temperature is 115° F. to 150° F.

6. Process as set forth in claim 5 wherein the aldehydes prior to mixing are at a temperature up to 85° F., and the temperature of the reaction mixture rises to 115 to 150° F. under substantially adiabatic conditions.

7. Process for the continuous production of pentaerythritol which comprises continuously mixing together acetaldehyde, 8 to 15 moles of formaldehyde per mole of acetaldehyde, water and sodium hydroxide rapidly and with agitation to cause said aldehydes and sodium hydroxide to react at a temperature of 115 to 160° F., said reactants being mixed to form a homogeneous mixture within a period of less than 15 seconds and the resulting homogeneous reacting mixture next flowing in a continuous stream without substantial back-mixing for a least about the next 5 minutes.

8. Process as set forth in claim 7 in which the proportion of sodium hydroxide is about 1 to 1.1 moles per mole of acetaldehyde and in which the reacting mixture flows upward continuously during said reaction.

9. Process for the production of pentaerythritol which comprises providing a continuous stream of a mixture of formaldehyde in excess, acetaldehyde and water, the molar ratio of formaldehyde to acetaldehyde being 8:1 to 15:1, continuously adding 1.0 to 1.1 equivalents of aqueous sodium hydroxide per mole of acetaldehyde to said stream with agitation so as to produce a homogeneous mixture within a period of mixing of less than 15 seconds whereby said aldehydes and said sodium hydroxide react exothermically to form pentaerythritol, maintaining said mixed reactants at a temperature of 130° to 140° F. for about 45 minutes to 2 hours to effect completion of said reaction, continuously neutralizing said reacted mixture to a pH of 5.0 to 7.0 with acetic acid, distilling off unreacted formaldehyde from said neutralized mixture at a pressure of about 15 to 20 pounds per square inch gauge until the formaldehyde content of the distillation residue is not above 1.0%, recycling a major portion of the formaldehyde distillate directly into admixture with said continuous stream while maintaining the methanol content of said stream below 1% based on the total weight of the mixture, concentrating the distillation residue by evaporation at an elevated temperature under subatmospheric pressure, and cooling the concentrated residue to precipitate crystals of pentaerythritol.

10. Process of claim 9 in which said continuous stream contains about 3% by weight of acetaldehyde, about 20% by weight of formaldehyde, and about 77% of water.

References Cited in the file of this patent

UNITED STATES PATENTS

| 2,170,624 | Wyler | Aug. 22, 1939 |
| 2,333,696 | Bludworth | Nov. 9, 1943 |

FOREIGN PATENTS

| 357,783 | Great Britain | Oct. 1, 1931 |
| 481,067 | Canada | Feb. 12, 1952 |